(12) United States Patent
Bond

(10) Patent No.: US 7,779,546 B2
(45) Date of Patent: *Aug. 24, 2010

(54) SELF SUPPORTING STRING LINE TOOL

(76) Inventor: William Ralph Bond, 4755 Asdee La., Woodbridge, VA (US) 22192

(*) Notice: Subject to any disclaimer, the term of this patent is extended or adjusted under 35 U.S.C. 154(b) by 173 days.

This patent is subject to a terminal disclaimer.

(21) Appl. No.: 12/012,200

(22) Filed: Feb. 1, 2008

(65) Prior Publication Data

US 2009/0193673 A1 Aug. 6, 2009

(51) Int. Cl.
*G01C 15/06* (2006.01)
(52) U.S. Cl. .................................. 33/409; 33/1 LE
(58) Field of Classification Search ............ 33/404, 33/407, 408, 410, 413, 418, 1 LE; 242/537, 242/539
See application file for complete search history.

(56) References Cited

U.S. PATENT DOCUMENTS

| 472,593 | A |   | 4/1892 | Tache |   |
|---|---|---|---|---|---|
| 492,636 | A |   | 2/1893 | Snyder |   |
| 1,094,286 | A |   | 4/1914 | Winstead |   |
| 1,579,886 | A |   | 4/1926 | Oxner |   |
| 1,630,475 | A |   | 5/1927 | Elder |   |
| 1,814,389 | A |   | 7/1931 | Jacobsen |   |
| 2,505,935 | A | * | 5/1950 | Batchler | 33/409 |
| 2,611,963 | A |   | 9/1952 | Zinken |   |
| 2,948,065 | A | * | 8/1960 | Simonic | 33/409 |
| 4,285,477 | A |   | 8/1981 | Oxendahl et al. |   |
| 5,664,739 | A | * | 9/1997 | Black et al. | 242/588.2 |
| 5,927,635 | A | * | 7/1999 | Black et al. | 242/395 |
| 6,036,133 | A |   | 3/2000 | Milligan |   |
| 6,276,627 | B1 |   | 8/2001 | Brodock |   |
| 6,412,184 | B1 |   | 7/2002 | Heavner |   |
| 6,581,295 | B1 |   | 6/2003 | Black |   |
| 6,829,836 | B1 | * | 12/2004 | Black | 33/369 |
| 6,964,109 | B1 |   | 11/2005 | Bond |   |
| 7,409,771 | B2 | * | 8/2008 | Bond | 33/409 |
| 2007/0029433 | A1 |   | 2/2007 | Bond |   |
| 2007/0089312 | A1 | * | 4/2007 | Wade | 33/409 |

* cited by examiner

*Primary Examiner*—Yaritza Guadalupe-McCall

(57) ABSTRACT

A string line tool having a string line reel and a uniquely shaped string line block integral with the string line reel. The string line tool is especially adapted to work on various construction tasks or jobs that require the use of a pair of pegs or rods stuck in the ground and spaced from each other at a predetermined distance. The uniquely shaped string line block has a semi-cylindrical inner surface and the string line reel has a string with a metal ring attached to a free end of the string. A main advantage in using this string line tool is that it is self supporting.

13 Claims, 6 Drawing Sheets

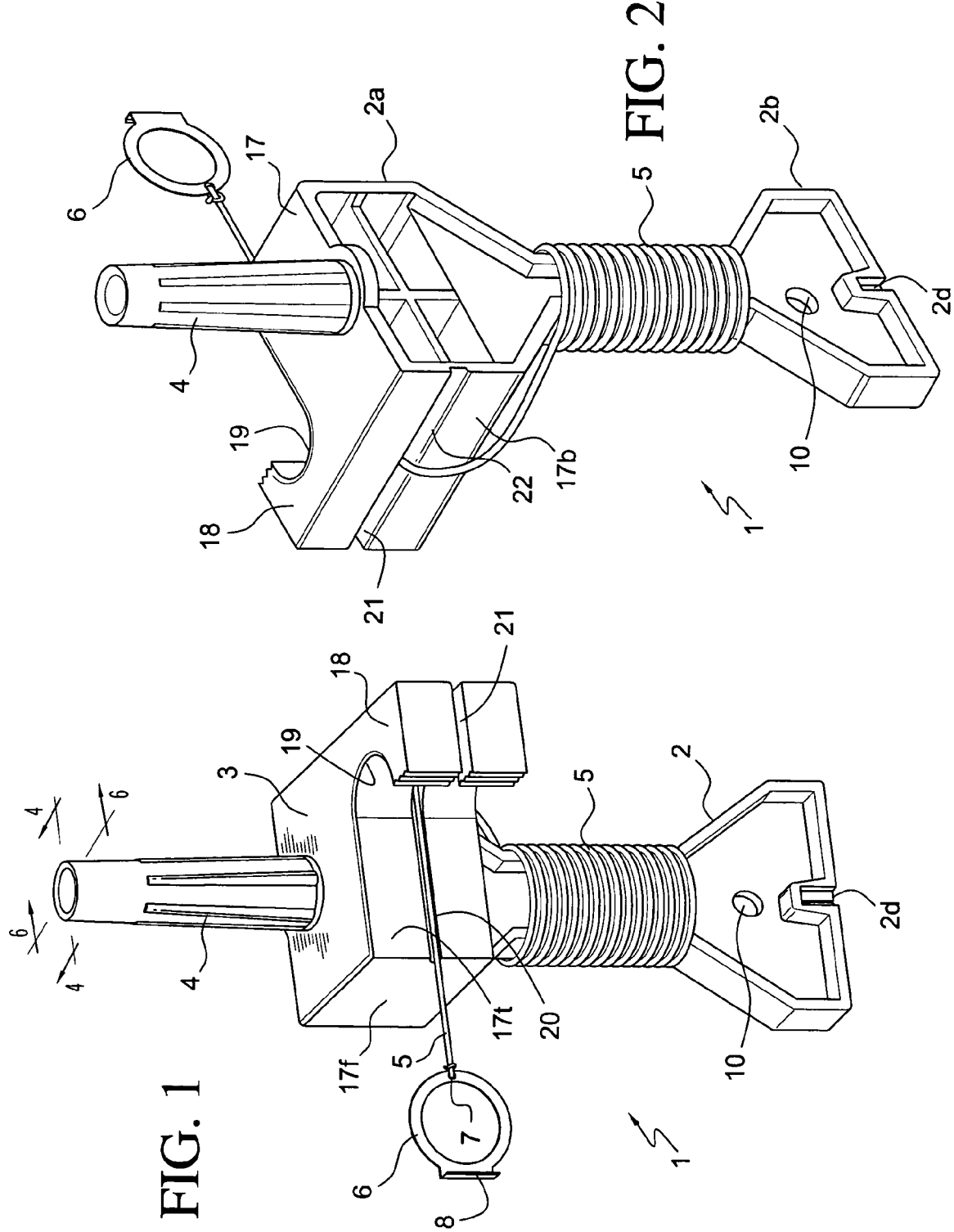

SELF SUPPORTING STRING LINE TOOL

BACKGROUND OF THE INVENTION

1. Field of the Invention

The present invention relates to the use of a string line tool for alignment work in masonry, carpentry and general construction.

2. Description of the Related Art

String line reels are conventionally used in construction work to provide a visible line by which the construction worker can use for aligning multiple construction units, e g., bricks or cinder blocks, as well as for other construction work that require the alignment of a plurality of construction units such as the alignment of a plurality of wooden planks for an outdoor deck. An old and well known string line reel is disclosed in the Oxendahl U.S. Pat. No. 4,285,277 whereby a string line is wound on a cord bearing head rotatably disposed on an elongated handle. However, the string line reel disclosed in this patent requires some extra work on the part of the construction worker in the fixing of the free end of the string line to the construction work and the holding of the string line reel at the opposite end of the string line when it is deployed. In other words, the string line reel is not self supporting as is a main feature of applicant's invention. The patent to Winstead U.S. Pat. No. 1,094,286 does, however, disclose a string line reel and holder which is self supporting when in use. The string line in this patent is wound around a hand rotatable reel at one end and is fixed to a support at its opposite end. When in use, the string line is placed on a wall or other surface and becomes strained between the rotatable reel and the opposite support and, therefore, the system is self supporting. The Heavner U.S. Pat. No. 6,412,184 discloses the use of line blocks and respective line holders located at opposite ends of a brick wall to stretch respective guide lines or string lines between opposing ends of the brick wall in order to maintain proper placement and alignment of brick courses. The line blocks in the Heavner patent are disclosed as being T-shaped. In this patent, the string line is under tension when the line blocks and line holders are used in the system. However, the line holders in this patent are neither shown nor disclosed. A pending patent application by the present inventor discloses a self supporting string line reel-line block tool which is more conducive in the alignment of construction elements with 90 degree corners such as bricks and cinder blocks because of the structure of the L-shaped line block of the tool. See Published Patent Application No. 2007/0029433. The purpose of the string line tool of this invention differs from the purpose of the inventor's published patent application in that the open spaced curvature in the line block of the inventor's published patent application is to wind an excess amount of string around the line block whereas the purpose of the semi-cylindrical surface in the string line block of the present invention is to hook around a rod or peg and capture the string between the rod or peg and the semi-cylindrical surface of the string line block.

SUMMARY OF THE INVENTION

The main purposes of this invention is to provide a self supporting string line tool which is especially adapted for providing a visible line by which the construction worker can use in a variety of different construction tasks or jobs that require the use of a string line stretched between spaced pegs, rods, etc., stuck in the ground. Construction tasks or jobs that the string line tool of this invention is especially adapted to are: providing an alignment line for laying down concrete or asphalt for walkways, driveways, streets, etc.; alignment for a plurality of tree samplings; alignment for fences; and for any other alignments requiring the use of spaced pegs or spaced rods stuck in the ground. The string line tool of this invention combines the features of a string line reel and a string line block having a continuously curved inner surface. The self supporting string line tool of this invention unites a hand held, rotatable string line reel with the uniquely structured string line block. The construction worker can place a metal ring, attached to a free end of the string of the string line reel, around a peg or rod stuck in the ground, pull the combined string line reel and string line block over a desired distance while keeping the string under tension, and finally hooking the string line block around another peg or rod stuck in the ground whereby the string, still under tension, becomes locked between the continuously curved inner surface of the string line block and the peg or rod thereby making the string line tool self supporting.

Thus, it is an object of this invention to provide a self supporting string line tool.

Another object of this invention is to provide a string line tool which will facilitate the alignment of different construction jobs or tasks that generally require the use of pegs, rods, etc., and a string line in the alignment process.

A further object of this invention is to save work time for the construction worker in the use of this unique tool.

Other objects and advantages in the use of the string line tool of this invention will become apparent upon reading the following description of which the attached drawings form a part.

BRIEF DESCRIPTION OF THE DRAWINGS

FIG. 1 is a front perspective view of the string line tool of this invention with the string wound thereon.

FIG. 2 is a rear perspective view of FIG. 1.

DETAILED DESCRIPTION OF THE PREFERRED EMBODIMENT

Figure 3:
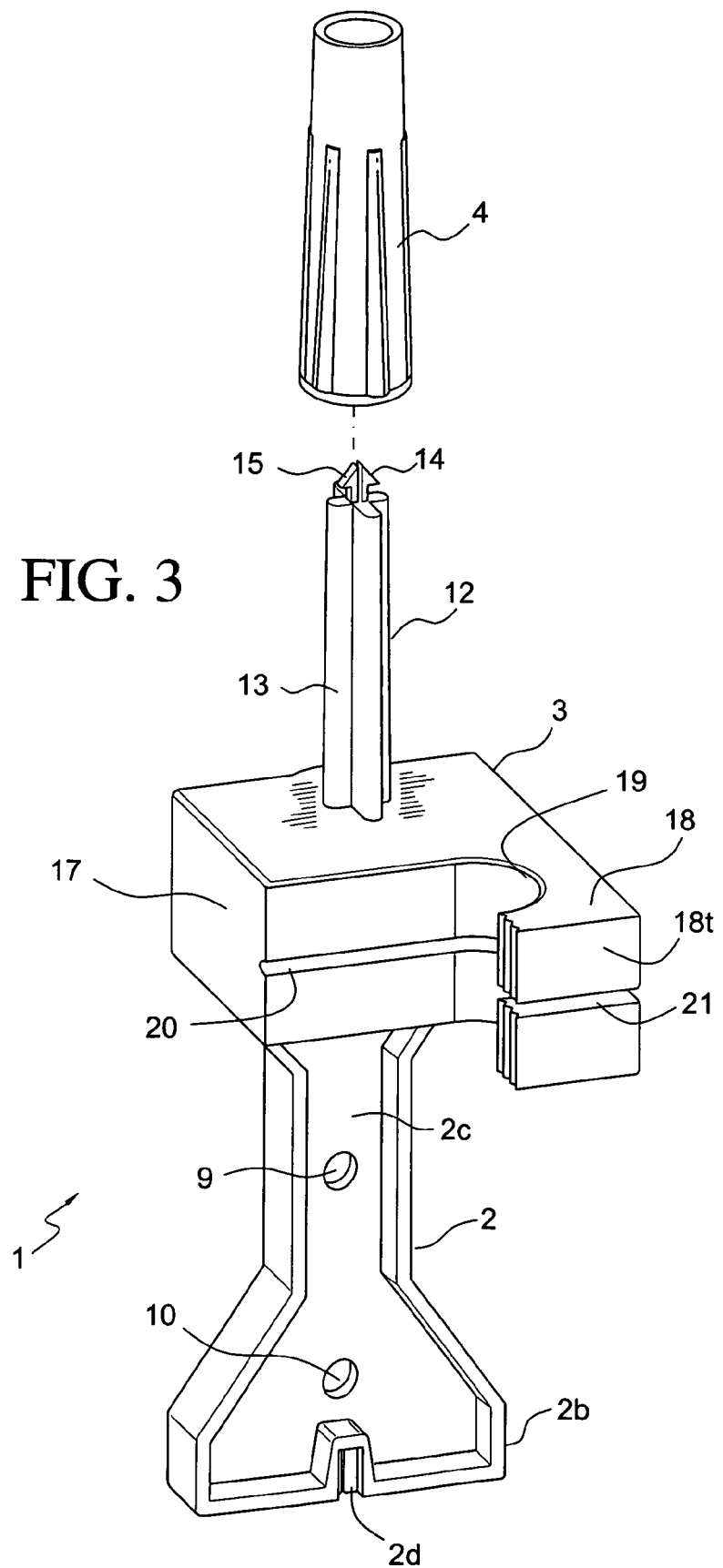
FIG. 3 is a front perspective view of the string line tool of this invention without the attached string and with the handle elevated above its support.
Figures 4, 5, 6:
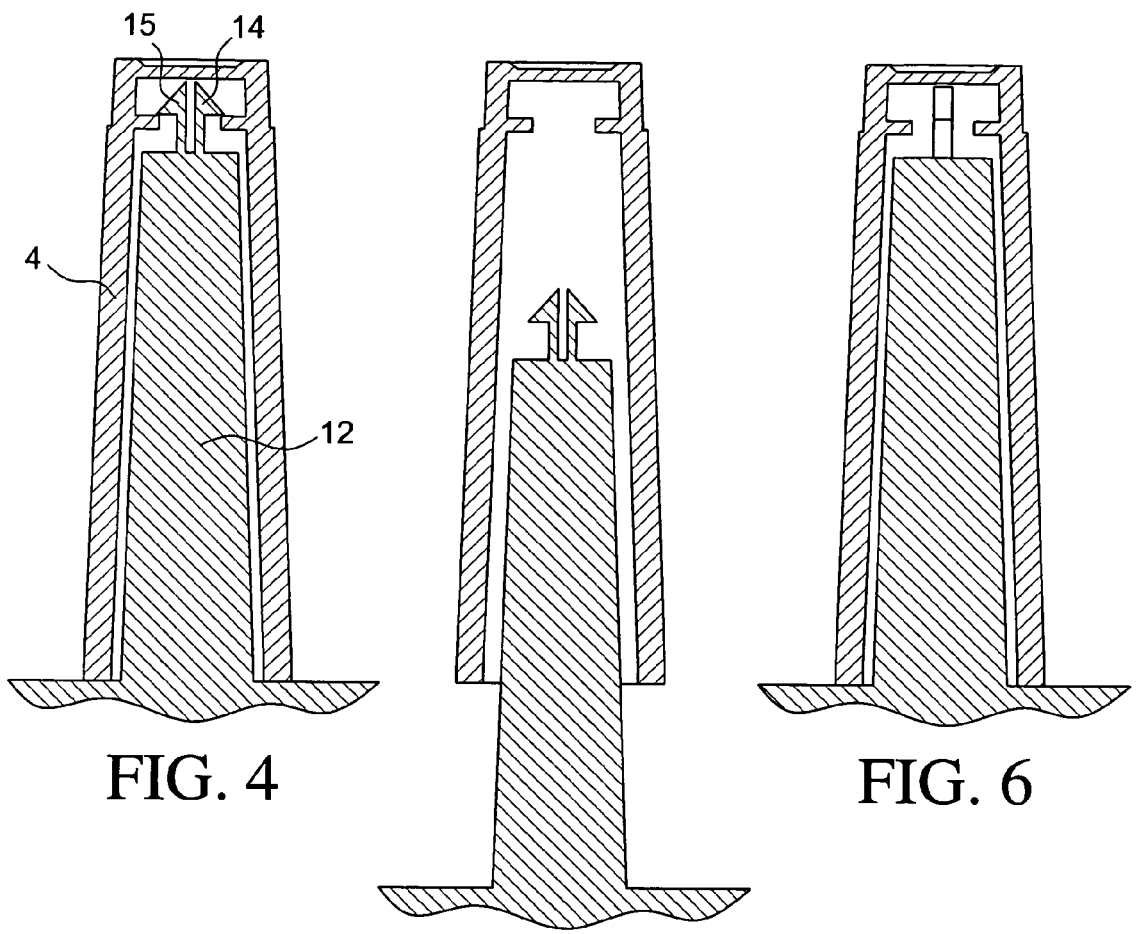
FIG. 4 is a partial cross-sectional view taken along lines 4, 4 in FIG. 1
FIG. 5 is similar to FIG. 4 but with the handle removed from its support.
FIG. 6 is a partial cross-sectional view taken along lines 6, 6 in FIG. 1.
Figures 7, 8:
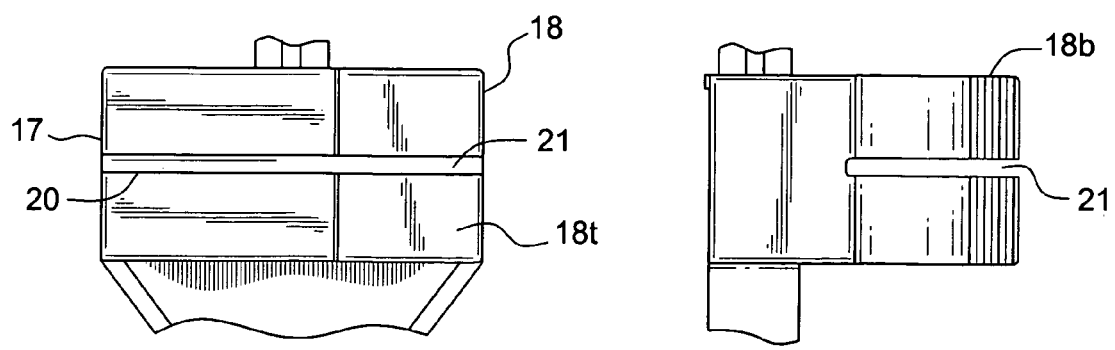
FIG. 7 is a partial top planar view of the line block of the string line tool of this invention.
FIG. 8 is a partial bottom planar view of the line block of the string line tool of this invention.

Referring to FIGS. 1, 2 and 3, there is shown the string line tool of this invention. The string line tool 1 is made of an elongate support member 2 with an L-shaped line block 3 which is integral with one end of the support member 2 and a rotatable and removable handle 4 at the same end of the support member 2 as the line block 3. A string 5 is wrapped around the central portion of the support member 2. A stretchable string 5, commonly used for string line devices, is used for the string line tool 1 of this invention. The string 5 generally has a length of between 100-300 feet. The free end of the string 5 is attached to a generally circular metal ring 6 and the opposite end of the string 5 is knotted to a hole 9 (FIG. 3) in the central portion of the support member 2. The circular metal ring 6 has a hole 7 therein and a bent over portion or hook portion 8 opposite thereto. The metal material for the circular metal ring 6 is made from aluminum, steel, stainless steel or some other similar metal. Although metal is preferred for the circular metal ring 6 other materials such as hard plastic or rubber may also be used in lieu thereof. There is a somewhat larger hole 10 (FIG. 3) near the bottom end of the support member 2; this hole 10 may be used for hanging the string line tool 1 in a storage condition. Integral with the top or upper end 2a of the support member 2 is an elongate handle support 12 for the rotatable handle 4. The overall longitudinal length of the support member 2 with its rotatable handle 4 is approximately 7 inches. The width of each wing 2a, 2b at the opposite ends of the support member 2 is approximately 2½ inches. The width of the central portion 2c of the support member 2 is approximately 1 inch. The major part of the central portion 2c has a flat surface on both sides thereof. A sufficiently narrow groove 2d is provided at the end of wing 2b in order to secure the free end of the string 5 when the string line tool 1 is not being used. The thickness of the central portion 2c of the support member 2 can vary from 1/16 inch to ½ inch.

Referring now to FIGS. 3, 4, 5, and 6 which give a more detailed showing of the handle 4 and its support 12. The length of the handle 4 is approximately 3 inches and has an inner diameter of approximately ½ inch. The handle 4 has a tapered outer diameter which is slightly smaller at its upper end than at its lower end. The length of the handle support 12 is approximately 2 and ¾ inch. The handle support 12 has four ribs 13 along its longitudinal length and a pair of somewhat resilient fingers 14 and 15 extending from the free end of the handle support 12. The fingers 14 and 15 are closely spaced from each other. Each of the fingers 14 and 15 has a protuberance, at their respective ends, extending perpendicularly away from the centerline of the handle support 12 and towards the inner surface of the handle 4. A rim 16 extends from the inner surface of the handle 4 and near the upper end of the handle 4. The handle 4 is slipped down over the handle support 12 and the rim 16 is forced over the extended protuberances of the pair of resilient fingers 14 and 15 to thereby firmly attach the handle 4 to the support member and allowing the handle to be rotatable relative to the handle support 12. The ribs 13 aid in stabilizing the handle 4 while the handle 4 is being rotated. The handle 4 may be removed from the handle support 12 for certain construction jobs by prying one of the fingers 14 or 15 inwardly (for example, by using an appropriate screwdriver) so that the handle 4 can be slipped out from the handle support 12.

The important feature of this invention is the operation of the line block 3 which is made integral with the upper end or wing 2a of the support member 2. Referring now to FIGS. 1, 2, 3, 7, and 8, there is shown a line block 3 which is approximately L-shaped having a first leg section 17 and a shorter second leg section 18. The first leg section 17 of the line block 3 is the part of the line block 3 which is made integral with the upper wing 2a of the support member 2. The longitudinal length of the first leg section 17 of the line block 3 is approximately 2 and ½ inches and the longitudinal length of the second leg section 18 of the line block 3 is approximately 2 inches. There is a semi-cylindrical inner surface 19 between the first and second leg sections 17, 18 of the line block 3. This semi-cylindrical inner surface 19 has a radius of approximately 0.5 inch although this radius could be greater if the diameter of the peg or rod is greater than an inch. However, the 0.5 inch radius is preferred since the rods and pegs generally used for the general construction projects intended for use of this string line tool 1 do not have a diameter greater than one inch. There is a shallow groove 20 in the top surface 17t of the first leg section 17 of the line block 3. The shallow groove 20 has a depth of approximately 1/16 inch and runs longitudinally from the front end 17f of the first leg section 17, up to and through the lower end of the semi-cylindrical surface 19, and colinearly with the bottom of a deep groove 21 in the second leg section 18. The deep groove 21 in the second leg section 18 extends from the top surface 18t of the second leg section 18 all the way down to the level of the shallow groove 20 of the first leg section 17. On the back surface 17b of the first leg section 17 there is another shallow groove 22 extending from the bottom of the deep groove 21 down to the bottom end 18b of the second leg section 18. The depth of the shallow grooves 20 and 22 is made deep enough to accommodate the sliding of the string 5 therein and therethrough.

The string line tool 1 of this invention may be made from plastic, metal or wood. Plastic is preferred, for example, AVS plastic. The manufacture of the string line tool 1 of this invention is made by injection molding of plastic and the handle 4 is also made by injection molding of plastic. Both the support member 2 and the line block 3 are preferably joined together as a single unit by injection molding. Alternatively, the support member 2 and the line block 3 may be made separately by injection molding and then attached to each other by some appropriate fastening means, e.g., adhesive, fusion, screw(s), etc.

Figure 9:
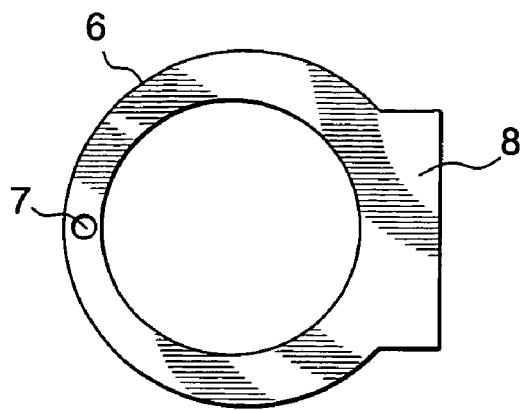
FIG. 9 is a top planar view of the metal ring 6.
Figure 10:
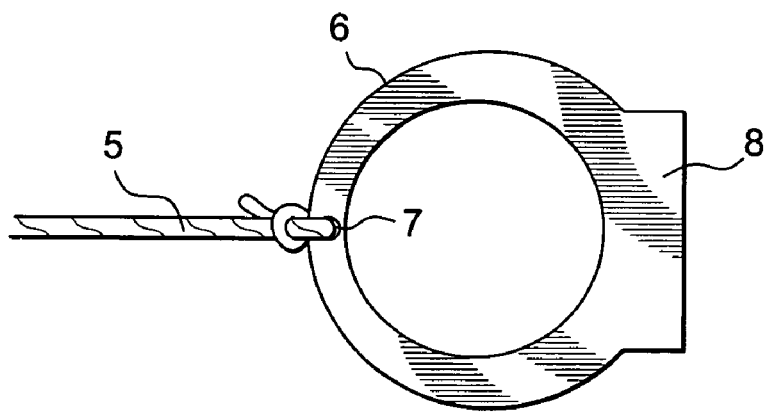
FIG. 10 is a top planar view of the metal ring 6 with the string 5 being attached to it through the hole 7.
Figure 11:
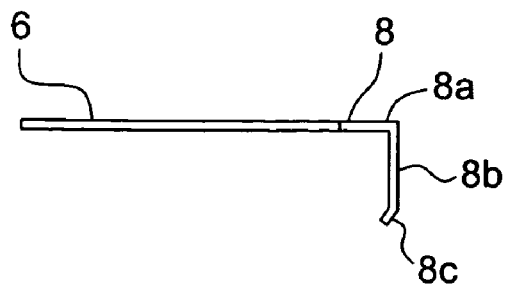
FIG. 11 is a side view of the metal ring 6 showing the bent-over or hook portion 8.

FIGS. 9, 10, and 11 show different views of the metal ring 6. FIG. 9 is a top planar view of the metal ring 6 without the string 5 being attached thereto. FIG. 10 is another top planar view of the metal ring 6 with the string 5 being attached to it through the hole 7. FIG. 11 is a side view of the metal ring 6 showing the bent-over portion or hook portion 8 of the metal ring 6. The inner diameter of the metal ring 6 is approximately ⅞ inch and the outer diameter (excluding the extended bent-over portion 8) is approximately 1¼ inch. The hook portion 8 of the metal ring 6 has three parts: an extended part 8a, a bent-down part 8b and a bent-inward part 8c. The extended part 8a is approximately ¼ inch; the bent-down part 8b is approximately ¼ inch and the bent-inward part 8c is approximately 1/16 inch. The dimensions of the metal ring 6 may vary depending on the particular application.

Figure 12:
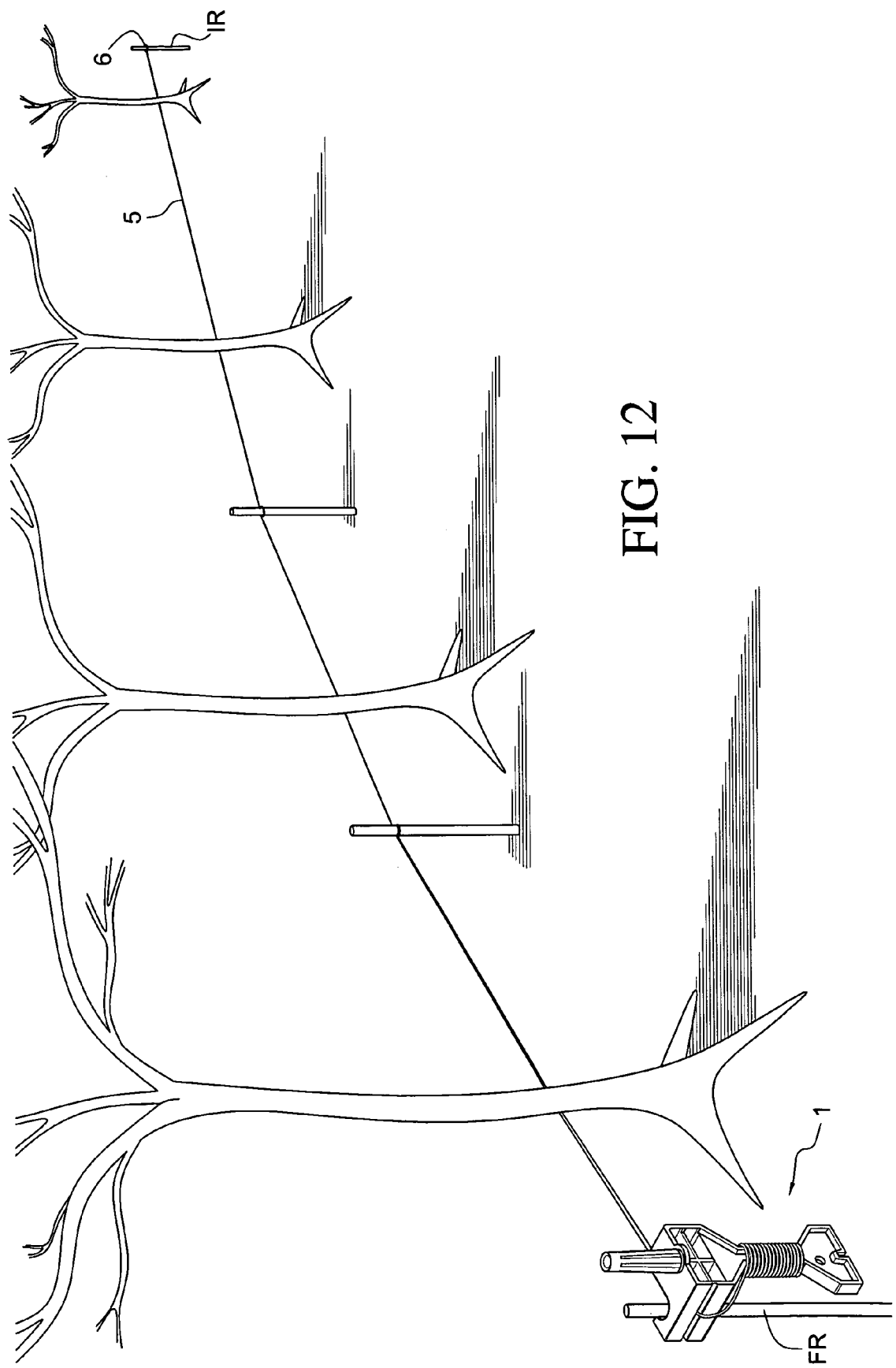
FIG. 12 shows an example of the use of the string line tool of this invention in the alignment of planting several trees for landscaping.

An example of an application of the string line tool 1 of this invention is now explained with reference to FIG. 12. For a landscaping project, it is desired to plant a plurality of trees along a particular periphery. The landscaper will position and strike into the ground a plurality of spaced rods along the desired periphery where the trees are to be planted. The landscaper will then slip the metal ring 6 of the string line tool 1 over the initial rod (IR) and pull the unitary string line reel and line block to the next spaced rod and then loops the string 5 around that rod while keeping the string 5 under tension. The landscaper will repeat this procedure for each rod along the periphery until the final rod (FR) is reached. The landscaper will finally hook the line block 3 around this final rod (FR) while aligning the string 5 in the shallow groove 20 and still maintaining the string 5 under tension such that the string 5 is captured between the final rod (FR) and the semi-cylindrical inner surface 19 of the line block 3 whereby the string line tool 1 will be self supporting.

Figure 13:
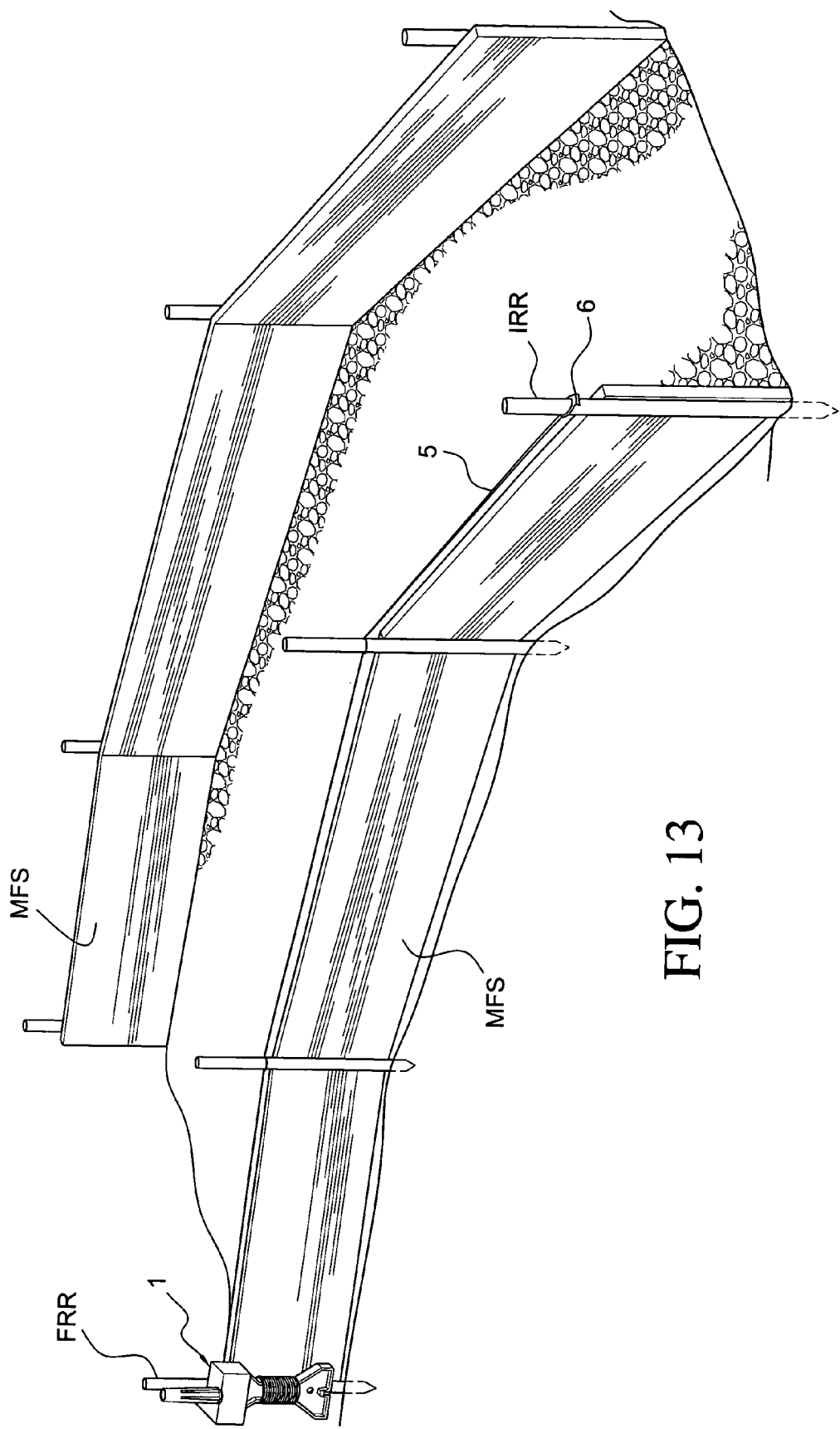
FIG. 13 shows another example of the use of the string line tool of this invention in the installation of a framework for laying down a cement sidewalk.

Another example of an application of the string line tool 1 of this invention is now explained with reference to FIG. 13. In the construction of a particularly configured cement sidewalk, the construction worker generally constructs a framework on both sides of the desired configured cement sidewalk. The framework generally comprises metal forms (MFS) 6 inches high. Therefore, the construction worker must align these metal forms (MFS) along both sides of the desired configured cement sidewalk which is conventionally 42 inches wide. The alignment of these metal forms (MFS) is done by utilizing the string line tool 1 of this invention and the placement of a plurality of spaced metal rods into the ground. The alignment of the metal rods along only one side of the desired configured cement sidewalk will be explained here since the alignment of the rods on the opposite side of the sidewalk is similar. The construction worker will position and strike into the ground a plurality of spaced rods along the desired path where the metal forms (MFS) are to be positioned for the layout of the cement sidewalk. The construction worker will then slip the metal ring 6 of the string line tool 1 over the initial rod (IRR) and pull the unitary string line reel and line block to the next spaced rod and then loops the string 5 around that rod while keeping the string 5 under tension. The construction worker will repeat this procedure for each successive rod along the desired path until the final rod (FRR) is reached. The construction worker will finally hook the line block 3 around the final rod (FRR) in a manner similar to that explained in the previous example whereby the string line tool 1 will be self supporting. The construction worker will then position the metal forms (MFS) along the path of the tensioned string 5. Finally, the construction worker will repeat this procedure on the opposite side where the cement sidewalk is to be laid down, conventionally, about 42 inches from the first alignment of the string 5.

Although the examples shown use round rods or pegs, it is understood that rods or pegs having other cross-sectional shapes, e.g., square, hexagonal, etc., may also be used provided that their diameters or thickness are small enough to fit into the semi-cylindrical surface portion of the line block 3 as well as being able to fit into the center of the metal ring 6.

Although the primary purpose of the metal ring 6 of the string line tool 1 of this invention is to slip around a rod or peg as one end of an anchor for this string line tool 1 it is also possible to use the hook portion 8 of the metal ring 6 as the anchor for certain construction jobs where the anchoring element has a 90 degree corner.

Modification of this invention will be readily apparent to those skilled in the art and it is intended that the invention be not limited by the embodiments disclosed herein but that the scope of the invention be defined by the appended claims.

What is claimed is:

1. In combination:
    a wheeled frame having a forward end, a rearward end, a first side and a second side;
    a side dump body movably mounted on said wheeled frame and having a rearward end, a forward end, a first side, a second side and an open upper end;
    said side dump body including a bottom wall, first and second side walls extending upwardly from said bottom wall, a forward end wall, and a rearward end wall;
    each of said first and second side walls of said side dump body having forward and rearward ends;
    each of said forward and rearward end walls of said side dump body having first and second ends;
    said side dump body being pivotally movable with respect to said wheeled frame so as to be able to dump the contents thereof towards said first side or said second side of said wheeled frame;
    a wall extension apparatus movably positioned on said upper ends of said walls of said side dump body;
    said wall extension apparatus being normally positioned in a transport position wherein said wall extension apparatus extends generally vertically upwardly from said upper ends of said walls of said side dump body to increase the carrying capacity of said side dump body;
    said wall extension apparatus including an upstanding first side wall member having upper and lower ends and forward and rearward ends, an upstanding second side wall member having upper and lower ends and forward and rearward ends, an upstanding forward end wall member having upper and lower ends and first and second ends, and an upstanding rearward end wall member having upper and lower ends and first and second ends;
    said wall extension apparatus being selectively pivotally movable with respect to said side dump body between a transport position to either a first side dumping position or a second side dumping position;
    said upstanding first side wall member of said wall extension apparatus being positioned on said upper end of said first side wall of said side dump body and extending upwardly therefrom when said wall extension apparatus is in its transport position;
    said upstanding second side wall member of said wall extension apparatus being positioned on said upper end of said second side wall of said side dump body and extending upwardly therefrom when said wall extension apparatus is in its transport position;
    said upstanding forward end wall member of said wall extension apparatus positioned on said upper end of said forward end wall of said side dump body and extending upwardly therefrom when said wall extension apparatus is in its transport position;
    said upstanding rearward wall member of said wall extension apparatus being positioned on said upper end of said rearward end wall of said side dump body and extending upwardly therefrom when said wall extension apparatus is in its transport position;
    said lower ends of said first side wall member, said second side wall member, said forward end wall member and said rearward end wall member of said wall extension apparatus being in engagement with said upper ends of said first side wall of said side dump body, said second side wall of said side dump body, said forward end wall of said side dump body, and said rearward end wall of said side dump body respectively when said wall extension apparatus is in its transport position;
    said lower end of said first side wall member of said wall extension apparatus being spaced from said upper end of said first side wall of said dump body, when said wall extension apparatus is in its first side dumping position;
    said lower end of said second side member being spaced from said upper end of said second side wall of said side dump body, when said wall extension apparatus is in its second side dumping position.

2. The combination of claim 1 wherein a forward hydraulic cylinder is pivotally secured to said forward end wall of said side dump body and to said forward end wall member of said wall extension apparatus and wherein a rearward hydraulic cylinder is pivotally secured to said rearward end wall of said side dump body and to said rearward end wall member of said wall extension apparatus for pivotally moving said wall extension apparatus between its transport position, its first side dumping position and its second side dumping position.

3. The combination of claim 1 wherein a first selectively lockable hinge pin selectively connects said lower end of said forward wall member of said wall extension apparatus, adjacent said first end thereof, to said forward end wall of said side dump body, adjacent said upper end thereof adjacent said first end thereof, and wherein a second selectively lockable hinge pin selectively connects said lower end of said rearward wall member of said wall extension apparatus, adjacent said first end thereof, to said rearward end wall of said side dump body, adjacent said upper end thereof adjacent said first end thereof, and wherein a third selectively lockable hinge pin selectively connects said lower end of said forward wall member of said wall extension apparatus, adjacent said second end thereof, to said forward end wall of said side dump body, adjacent said upper end thereof adjacent said second end thereof, and wherein a fourth selectively lockable hinge pin connects said lower end of said rearward end wall member of said wall extension, adjacent said second end thereof to said rearward end wall of said side dump body, adjacent said upper end thereof adjacent said second end thereof.

4. In combination:
- a wheeled frame having a forward end, a rearward end, a first side and a second side;
- a side dump body movably mounted on said wheeled frame and having a rearward end, a forward end, a first side, a second side and an open upper end;
- side dump body including a bottom wall, first and second side walls extending upwardly from said bottom wall, a forward end wall, and a rearward end wall;
- each of said first and second side wall of said side dump body having forward and rearward ends;
- each of said forward and rearward end walls of said side dump body having first and second ends;
- said side dump body being pivotally movable with respect to said wheeled frame so as to be able to dump the contents thereof towards said first side or said second side of said wheeled frame;
- a box-like wall extension apparatus movably positioned on said upper ends of said walls of said side dump body;
- said wall extension apparatus including: (a) an upstanding first side wall member having an upper end, a lower end, a forward end and a rearward end, (b) an upstanding second side wall member having an upper end, a lower end, a forward end and a rearward end, (c) a first upstanding forward wall member having an upper end, a lower end, an outer end and an inner end, (d) a second upstanding forward wall member having an upper end, a lower end, an outer end and an inner end, (e) a first upstanding rearward wall member having an upper end, a lower end, an outer end and an inner end, and (f) a second upstanding rearward wall member having an upper end, a lower end, an outer end and inner end;
- said first and second forward wall members of said wall extension apparatus extending inwardly towards one another from said forward ends of said first and second side walls of said side dump body respectively with the inner ends thereof overlapping one another;
- said first and second rearward wall members of said wall extension apparatus extending inwardly towards one another from said rearward ends of said first and second side walls of said side dump body respectively with the inner ends thereof overlapping one another;
- said outer ends of said first and second forward wall members of said wall extension apparatus being selectively secured to said forward ends of said first and second side walls of said side dump body respectively;
- said outer ends of said first and second rearward wall members of said wall extension apparatus being selectively secured to said rearward ends of said first and second side walls of said side dump body respectively;
- said first forward end wall member, said first side wall member and said first rearward wall member of said wall extension apparatus being selectively movable with respect to said side dump body between a transport position and a first side dumping position;
- said lower ends of said first forward wall member, said first side wall member and said first rearward wall member of said wall extension apparatus being in engagement with said upper ends of said forward end wall, said first side wall and said rearward end wall of said side dump body when said wall members are in their transport position;
- said lower end of said first side wall member of said wall extension apparatus being spaced from said upper end of said first side wall of said side dump body when said wall members are in their first side dumping position;
- said second forward end wall member, said second side wall member and said second rearward wall member of said wall extension apparatus being selectively movable with respect to said side dump body between a transport position and a second side dumping position;
- said lower ends of said second forward end wall member, said second side wall member and said second rearward end wall member of said wall extension apparatus being in engagement with said upper ends of said forward end wall, said second side wall and said rearward end wall of said side dump body when said wall members are in their transport position;
- said lower end of second side wall member of said wall extension apparatus being spaced from said upper end of said second side wall of said side dump body when said wall members are in their second side dumping position;
- said lower outer ends of said first forward end wall member, said second forward end wall member; said first rearward end wall member and said second rearward end wall member being selectively removably secured to said forward end wall and said rearward end wall of said side dump body respectively;
- said lower inner ends of said first forward end wall member and said second forward end wall members of said wall extension apparatus being hingedly secured to said forward end wall of said side dump body about a horizontal axis;
- said lower inner ends of said first rearward end wall member and said second rearward end wall member of said wall extension apparatus being hingedly secured to said rearward end wall of said side dump body about a horizontal axis;
- a first hydraulic cylinder pivotally secured to and extending between said first and second forward end wall members of said wall extension apparatus;
- a second hydraulic cylinder pivotally secured to and extending between said first and second rearward end wall members of said wall extension apparatus;
- said first and second hydraulic cylinders adapted to move said first forward end wall member, said first side wall member and said first rearward end wall member between their said transport and first side dumping position when the lower outer ends of said first forward end wall member and said first rearward end wall member of wall extension apparatus are disconnected from said forward and rearward end walls of said side dump body;

said first and second hydraulic cylinders adapted to move said second forward end wall member, said second side wall member and said second rearward end wall member between their said transport and second side dumping positions when the lower outer ends of said second forward end wall member and said second rearward end wall member of wall extension apparatus are disconnected from said forward and rearward end walls of said side dump body.

5. The combination of claim 4 wherein a first selectively lockable pin selectively connects said lower end of said first forward end wall member of said wall extension apparatus, adjacent said first end thereof, to said forward end wall of said side dump body, adjacent said upper end thereof adjacent said first end thereof, and wherein a second selectively lockable pin selectively connects said lower end of said first rearward end wall member of said wall extension apparatus, adjacent said first end thereof, to said rearward end wall of said side dump body, adjacent said upper end thereof adjacent said first end thereof, and wherein a third selectively lockable pin selectively connects said lower end of said second forward end wall member of said wall extension apparatus adjacent said second end thereof, to said forward end wall of said side dump body, adjacent said upper end thereof adjacent said second end thereof, and wherein a fourth selectively lockable pin selectively connects said lower end of said second rearward end wall member of said wall extension apparatus adjacent said second end thereof to said rearward end wall of said side dump body, adjacent said upper end thereof adjacent said second end thereof.

6. In combination:
a wheeled frame having a forward end, a rearward end, a first side and a second side;
a side dump body movably mounted on said wheeled frame and having a rearward end, a forward end, a first side, a second side and an open upper end;
said side dump body including a bottom wall, first and second side walls extending upwardly from said bottom wall, a forward end wall, and a rearward end wall;
each of said first and second side wall of said side dump body having forward and rearward ends;
each of said forward and rearward end walls of said side dump body having first and second ends;
said side dump body being pivotally movable with respect to said wheeled frame so as to be able to dump the contents thereof towards said first side or said second side of said wheeled frame;
a box-like wall extension apparatus movably positioned on said upper ends of said walls of said side dump body;
said wall extension apparatus including: (a) an upstanding first side wall member having an upper end, a lower end, a forward end and a rearward end, (b) an upstanding second side wall member having an upper end, a lower end, a forward end and a rearward end, (c) a first upstanding forward wall member having an upper end, a lower end, an outer end and an inner end, (d) a second upstanding forward wall member having an upper end, a lower end, an outer end and an inner end, (e) a first upstanding rearward wall member having an upper end, a lower end, an outer end and an inner end, and (f) a second upstanding rearward wall member having an upper end, a lower end, an outer end and inner end;
said first and second forward wall members of said wall extension apparatus extending inwardly towards one another from said forward ends of said first and second side walls of said side dump body respectively with the inner ends thereof overlapping one another;
said first and second rearward wall members of said wall extension apparatus extending inwardly towards one another from said rearward ends of said first and second side walls of said side dump body respectively with the inner ends thereof overlapping one another;
said outer ends of said first and second forward wall members of said wall extension apparatus being selectively secured to said forward ends of said first and second side walls of said side dump body respectively;
said outer ends of said first and second rearward wall members of said wall extension apparatus being selectively secured to said rearward ends of said first and second side walls of said side dump body respectively;
said first forward end wall member, said first side wall member and said first rearward wall member of said wall extension apparatus being selectively movable with respect to said side dump body between a transport position and a first side dumping position;
said lower ends of said first forward wall member, said first side wall member and said first rearward wall member of said wall extension apparatus being in engagement with said upper ends of said forward end wall, said first side wall and said rearward end wall of said side dump body when said wall members are in their transport position;
said lower end of said first side wall member of said wall extension apparatus being spaced from said upper end of said first side wall of said side dump body when said wall members are in their first side dumping position;
said second forward end wall member, said second side wall member and said second rearward wall member of said wall extension apparatus being selectively movable with respect to said side dump body between a transport position and a second side dumping position;
said lower ends of said second forward end wall member, said second side wall member and said second rearward end wall member of said wall extension apparatus being in engagement with said upper ends of said forward end wall, said second side wall and said rearward end wall of said side dump body when said wall members are in their transport position;
said lower end of second side wall member of said wall extension apparatus being spaced from said upper end of said second side wall of said side dump body when said wall members are in their second side dumping position;
said lower outer ends of said first forward end wall member, said second forward end wall member; said first rearward end wall member and said second rearward end wall member being selectively removably secured to said forward end wall and said rearward end wall of said side dump body respectively;
said lower inner ends of said first forward end wall member and said second forward end wall members of said wall extension apparatus being hingedly secured to said forward end wall of said side dump body about a horizontal axis;
said lower inner ends of said first rearward end wall member and said second rearward end wall member of said wall extension apparatus being hingedly secured to said rearward end wall of said side dump body about a horizontal axis;
a first hydraulic cylinder pivotally secured to and extending between said first forward end wall member of said wall extension apparatus and said forward end wall of said side dump body;
a second hydraulic cylinder pivotally secured to and extending between said second forward end wall member of said wall extension apparatus and said forward end wall of said side dump body;

a third hydraulic cylinder pivotally secured to and extending between said first rearward end wall member of said wall extension apparatus and said rearward end wall of said side dump body;

a fourth hydraulic cylinder pivotally secured to and extending between said second rearward wall member of said wall extension apparatus and said rearward end wall of said side dump body;

said first and third hydraulic cylinders adapted to move said first forward end wall member, said first side wall member and said first rearward end wall member of said wall extension apparatus between their said transport and first side dumping position when the lower outer ends of said first forward end wall member and said first rearward end wall member of wall extension apparatus are disconnected from said forward and rearward end walls of said side dump body, said second and fourth hydraulic cylinder adapted to move said second forward end wall member, said second side wall member and said second rearward end wall member of said wall extension apparatus when lower outer ends of said second forward end wall member and said second rearward end wall member of said wall extension apparatus are disconnected from said forward end walls of said side dump body.

7. The combination of claim 6 wherein a first selectively lockable pin selectively connects said lower end of said first forward wall member of said wall extension apparatus, adjacent said outer end thereof, to said forward end wall of said side dump body, adjacent said upper end thereof adjacent said first end thereof, and wherein a second selectively lockable pin selectively connects said lower end of said first rearward wall member of said wall extension apparatus, adjacent said outer end thereof, to said rearward end wall of said side dump body, adjacent said upper end thereof adjacent said first end thereof, and wherein a third selectively lockable pin selectively connects said lower end of said second forward wall member of said wall extension apparatus adjacent said outer end thereof, to said forward end wall of said side dump body, adjacent said upper end thereof adjacent said second end thereof, and wherein a fourth selectively lockable pin connects said lower end of said second rearward end wall member of said wall extension apparatus adjacent said outer end thereof to said rearward end wall of said side dump body, adjacent said upper end thereof adjacent said second end thereof.

8. In combination:

a wheeled frame having a forward end, a rearward end, a first side and a second side;

a side dump body movably mounted on said wheeled frame and having a rearward end, a forward end, a first side, a second side and an open upper end;

said side dump body including a bottom wall, first and second side walls extending upwardly from said bottom wall, a forward end wall, and a rearward end wall;

each of said first and second side walls of said side dump body having forward and rearward ends and an upper end;

each of said forward and rearward end walls of said side dump body having first and second ends and an upper end;

said side dump body being pivotally movable with respect to said wheeled frame so as to be able to dump the contents thereof towards said first side or said second side of said wheeled frame;

a generally, box-like wall extension apparatus movably positioned on said upper ends of said walls of said side dump body;

said wall extension apparatus including: (a) an upstanding first side wall member having an upper end, a lower end, a forward end and a rearward end, (b) an upstanding second side wall member having an upper end, a lower end, a forward end and a rearward end, (c) a first upstanding forward wall member having an upper end, a lower end, an outer end and an inner end, (d) a second upstanding forward wall member having an upper end, a lower end, an outer end and an inner end, (e) a first upstanding rearward wall member having an upper end, a lower end, an outer end and an inner end, and (f) a second upstanding rearward wall member having an upper end, a lower end, an outer end and inner end;

said first and second forward wall members of said wall extension apparatus extending inwardly towards one another from said forward ends of said first and second side walls of said side dump body respectively with the inner ends thereof overlapping one another;

said first and second rearward wall members of said wall extension apparatus extending inwardly towards one another from said rearward ends of said first and second side walls of said side dump body respectively with the inner ends thereof overlapping one another;

said outer ends of said first and second forward wall members of said wall extension apparatus being secured to said forward ends of said first and second side walls of said side dump body respectively;

said outer ends of said first and second rearward wall members of said wall extension apparatus being secured to said rearward ends of said first and second side walls of said side dump body respectively;

said first forward end wall member, said first side wall member and said first rearward wall member of said wall extension apparatus being selectively movable with respect to said side dump body between a transport position and a first side dumping position;

said lower ends of said first forward wall member, said first side wall member and said first rearward wall member of said wall extension apparatus being in engagement with said upper ends of said forward end wall, said first side wall and said rearward end wall of said side dump body when said wall members are in their transport position;

said lower end of said first side wall member of said wall extension apparatus being spaced from said upper end of said first side wall of said side dump body when said wall members are in their first side dumping position;

said second forward end wall member, said second side wall member and said second rearward wall member of said wall extension apparatus being selectively movable with respect to said side dump body between a transport position and a second side dumping position;

said lower ends of said second forward end wall member, said second side wall member and said second rearward end wall member of said wall extension apparatus being in engagement with said upper ends of said forward end wall, said second side wall and said rearward end wall of said side dump body when said wall members are in their transport position;

said lower end of second side wall member of said wall extension apparatus being spaced from said upper end of said second side wall of said side dump body when said wall members are in their second side dumping position;

said lower outer ends of said first forward end wall member, said second forward end wall member; said first rearward end wall member and said second rearward end wall member being selectively removably secured to said forward end wall and said rearward end wall of said side dump body respectively;

said lower inner ends of said first forward end wall member and said second forward end wall members of said wall extension apparatus being hingedly secured to said forward end wall of said side dump body about a horizontal axis;

said lower inner ends of said first rearward end wall member and said second rearward end wall member of said wall extension apparatus being hingedly secured to said rearward end wall of said side dump body about a horizontal axis;

said wall extension apparatus including structure which causes said lower end of said first side wall member of said wall extension apparatus to move out of engagement which said upper end of said first side wall of said side dump body when said wall extension apparatus is moved from its said transport position to its said first side dumping position and said side dump body is pivotally moved to dump the contents thereof from said first side of said wheeled frame and which causes said lower end of said second side wall member of said wall extension apparatus to move out of engagement with said upper end of said second side wall of said side dump body when said wall extension apparatus is moved from its said transport position to its said second side dumping position and said side dump body is pivotally moved to dump the contents thereof from said second side of said wheeled frame.

9. The combination of claim 8 wherein a forward hydraulic cylinder having a body and a cylinder rod is pivotally secured to and extends between said wheeled frame and said forward end wall of said side dump body and wherein a rearward hydraulic cylinder having a body and a cylinder rod is pivotally secured to and extends between said wheeled frame and said rearward end wall of said dump body and wherein said structure for moving said wall extension apparatus from its said transport position to its said first and second side dumping positions comprises: (a) a first and second sheaves rotatably secured to said first forward end wall member of said wall extension apparatus about a horizontal axis, (b) a first flexible cable extending around said first sheave and downwardly therefrom and having its first and second ends selectively removably secured to said forward end wall of said side dump body at opposite sides of said forward hydraulic cylinder and laterally outwardly therefrom, (c) a second flexible cable wrapped around said second sheave and having its first and second ends secured to said first and second forward end wall member of said wall extension apparatus respectively, (d) said first and second ends of said first cable also being selectively removably secured to the body of said forward hydraulic cylinder, (e) a third and fourth sheaves rotatably secured to said first rearward end wall member of said wall extension apparatus about a horizontal axis, (f) a third flexible cable extending around said third sheave and downwardly therefrom and having its first and second ends selectively removably secured to said rearward end wall of said side dump body of opposite sides of said rearward hydraulic cylinder and laterally outwardly therefrom, (g) a fourth flexible cable wrapped around said fourth sheave and having its first and second ends secured to said first and second rearward end wall members of said wall extension apparatus respectively, (h) said first and second ends of said third cable, also being selectively removably secured to the body of said rearward hydraulic cylinder.

10. In combination:
a wheeled frame having a forward end, a rearward end, a first side and a second side;
a side dump body movably mounted on said wheeled frame and having a rearward end, a forward end, a first side, a second side and an open upper end;
said side dump body including a bottom wall, first and second side walls extending upwardly from said bottom wall, a forward end wall, and a rearward end wall;
each of said first and second side walls of said side dump body having forward and rearward ends and an upper end;
each of said forward and rearward end walls of said side dump body having first and second ends and an upper end;
said side dump body being pivotally movable with respect to said wheeled frame so as to be able to dump the contents thereof towards said first side or said second side of said wheeled frame;
a wall extension apparatus selectively movably positioned on said upper end of said side dump body which extends upwardly from said side dump body;
said wall extension apparatus including an upstanding first side wall member having upper and lower ends and forward and rearward ends, an upstanding forward wall member having upper and lower ends and inner and outer ends and an upstanding rearward wall member having upper and lower ends and inner and outer ends;
said inner ends of said forward wall member and said rearward wall member of said wall extension apparatus being pivotally connected about a horizontal axis to said upper ends of said forward end wall and said rearward end wall of said side dump body respectively whereby said extension wall apparatus may be selectively moved between first and second transport positions;
said lower ends of said wall members of said wall extension apparatus being in engagement with said upper ends of said forward wall, said first side wall, and said rearward wall of said side dump body when said wall extension apparatus is in its said first transport position;
said upper ends of said wall members of said wall extension apparatus being in engagement with said upper ends of said forward wall, said second wall, and said rearward wall of said side dump body when said wall extension apparatus is in its said second transport position.

11. The combination of claim 10 further including locking means to lock said wall extension apparatus in its said first transport position and in its said second transport position.

12. The combination of claim 11 further including selectively removable locking pins which lock said wall extension apparatus in either of its said first and second transport positions.

13. In combination:
a wheeled frame having a forward end, a rearward end, a first side and a second side;
a side dump body movably mounted on said wheeled frame and having a rearward end, a forward end, a first side, a second side and an open upper end;
said side dump body including a bottom wall, first and second side walls extending upwardly from said bottom wall, a forward end wall, and a rearward end wall;
each of said first and second side walls of said side dump body having forward and rearward ends;
each of said forward and rearward end walls of said side dump body having first and second ends;

said side dump body being pivotally movable with respect to said wheeled frame so as to be able to dump the contents thereof towards said first side or said second side of wheeled frame;

a wall extension apparatus movably positioned on said upper ends of said walls of said side dump body;

said wall extension apparatus being normally positioned in a transport position wherein said wall extension apparatus extends generally upwardly from said upper ends of said walls of said dump body to increase the carrying capacity of said side dump body;

said wall extension apparatus being selectively movable with respect to said side dump body from its said transport position to at least a first side dumping position.

* * * * *

UNITED STATES PATENT AND TRADEMARK OFFICE
CERTIFICATE OF CORRECTION

PATENT NO. : 7,779,546 B2
APPLICATION NO. : 12/012200
DATED : August 24, 2010
INVENTOR(S) : William Ralph Bond It is certified that error appears in the above-identified patent and that said Letters Patent is hereby corrected as shown below:

On the cover page of the patent, <u>insert</u>:
   --(74) Attorney, Agent, or Firm–Palmer C. Demeo--

<u>Delete</u> presently existing claims 1-13 and insert the following claims 1-13:

Col. 5 Line 55-69 Claim 1
--1.  A string line tool comprising a string line reel and a string line block, said string line reel including an elongate support member with a first end, a second end and an intermediate section therebetween, said string line block being attached to said first end of said elongate support member, an elongate handle support extending from said string line block, a rotatable elongate handle attached to said elongate handle support, said string line block being approximately L-shaped with a first leg section and a second leg section, said first leg section being attached to said first end of said elongate support member, said string line block having an open semi-cylindrical inner surface within said second leg section, a groove extending longitudinally through said first and second leg sections of said string line block, a string attached to and wound around said intermediate section of said elongate support member, said string having a free end, an anchor ring attached to said free end of said string and said string passing through said groove when said string line tool is being used for a particular application.--

Col. 6 line 1-2 Claim 2
--2.  The string line tool of claim 1 wherein said first leg section is longer than said second leg section.--

Col. 6 line 3-5 Claim 3
--3.  The string line tool of claim 2 wherein said groove is a shallow groove along a top surface of said first leg section and is a deep groove in said second leg section, said shallow groove being colinear with the bottom of said deep groove.--

Col. 6 line 6-7 Claim 4
--4.  The string line tool of claim 3 wherein said semi-cylindrical inner surface intersects both said shallow groove and said deep groove.--

Signed and Sealed this
Twenty-eighth Day of December, 2010

David J. Kappos
*Director of the United States Patent and Trademark Office*

Col. 6 line 8-9 Claim 5

--5. The string line tool of claim 4 wherein said semi-cylindrical inner surface has a radius of approximately 0.5 inch.--

Col. 6 line 10-13 Claim 6

--6. The string line tool of claim 5 wherein said first leg section has a rear surface co-jointly with a rear surface of said second leg section and said rear surface of said first leg section has a shallow groove extending from said deep groove in said second leg section towards said first end of said elongate support member.--

Col. 6 line 14-16 Claim 7

--7. The string line tool of claim 1 wherein said elongate support member, said string line block and said elongate handle support are integrally attached and form a unitary structure.--

Col. 6 line 17-19 Claim 8

--8. The string line tool of claim 1 wherein said elongate support member, said elongate handle, said elongate handle support and said string line block are made from plastic, metal or wood.--

Col. 6 line 20-22 Claim 9

--9. The string line tool of claim 8 wherein said elongate support member, said elongate handle, said elongate handle support and said string line block are made from plastic.--

Col. 6 line 23-25 Claim 10

--10. The string line tool of claim 9 wherein said elongate support member, said elongate handle, said elongate handle support and said string line block are made by injection molding.--

Col. 6 line 26-27 Claim 11

--11. The string line tool of claim 1 wherein said anchor ring has a hole within its periphery for attaching said string thereto.--

Col. 6 line 28-29 Claim 12

--12. The string line tool of claim 11 wherein said anchor ring has a peripheral extension opposite to said hole, said extension having a bent down part forming a hook.--

Col. 6 line 30-33 Claim 13

--13. The string line tool of claim 1 wherein said elongate handle support is cone shaped, a hollow elongate cone shaped handle spaced from and surrounding said elongate cone shaped handle support, and said handle being freely rotatable around said elongate handle support.--